L. G. PEEL.
Gin-Saw Filing-Machines.
No. 148,493. Patented March 10, 1874.
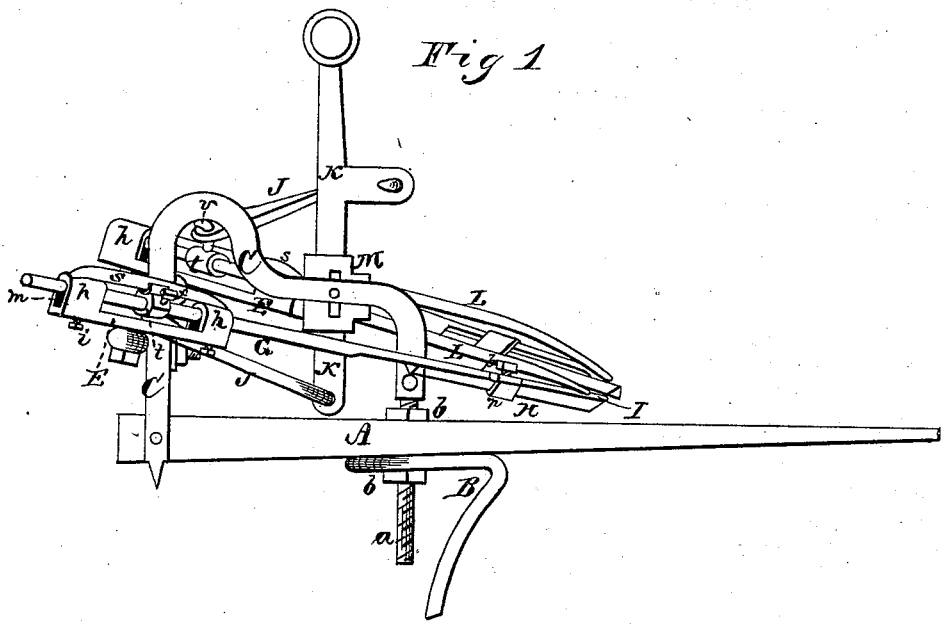
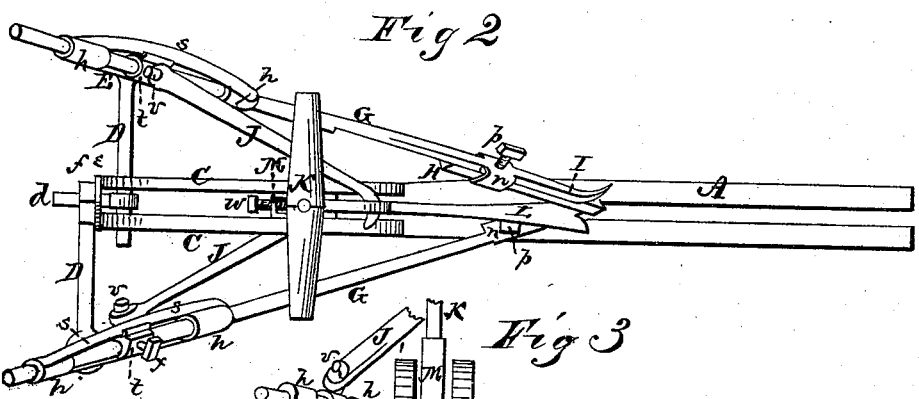
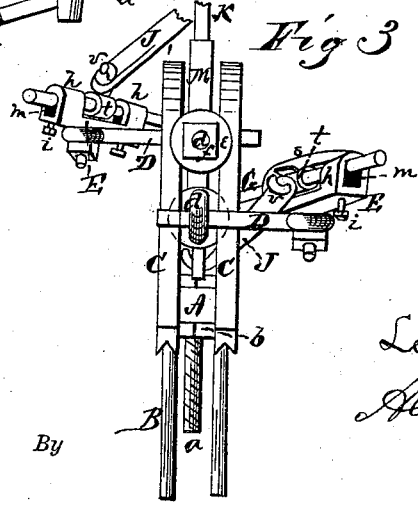
WITNESSES.
INVENTOR
Lawson G. Peel.
Attorneys.

UNITED STATES PATENT OFFICE.

LAWSON G. PEEL, OF HAZLEHURST, MISSISSIPPI.

IMPROVEMENT IN GIN-SAW-FILING MACHINES.

Specification forming part of Letters Patent No. 148,493, dated March 10, 1874; application filed January 23, 1874.

*To all whom it may concern:*

Be it known that I, LAWSON G. PEEL, of Hazlehurst, in the county of Copiah and in the State of Mississippi, have invented certain new and useful Improvements in Saw-Sharpeners; and do hereby declare that the following is a full, clear, and exact description thereof, reference being had to the accompanying drawings, and to the letters of reference marked thereon, making a part of this specification.

The nature of my invention consists in the construction and arrangement of a machine for sharpening gin-saws, as will be hereinafter more fully set forth.

In the accompanying drawing, Figure 1 is a side elevation of my machine. Fig. 2 is a plan view, and Fig. 3 a rear elevation, of the same.

A represents a metal bar, of any suitable dimensions, forming the stock or bed of the machine. This stock A is slotted longitudinally from the front end toward the rear for a suitable distance, to form a fork for straddling the saw to be sharpened. In rear of this slot a hole is made through the stock A, for the passage of a screw, $a$, having a nut, $b$, above and another below the stock. This screw and nuts hold an adjustable gage, B, under the stock, which gage is to rest on the block between the saws. The upper end of the bolt or screw $a$ is formed with an eye, and pivoted in the front end of a frame formed of two bars, C C, which are curved substantially in the manner shown in Fig. 1, and their rear ends pivoted to the rear end of the stock, one on each side thereof. The rear portions of the bars or frame C are comparatively straight, and between them pass two eyebolts, $d\ d$, having each an arm, D, inserted through the eye, and a nut, $f$, and washer $e$ placed upon the screw end for securing the arms to the frame. The arms D D extend in opposite directions, and may be adjusted up and down, as desired. On the outer end of each arm D is attached a plate or bar, E, by means of a bolt and nut, as shown, so that the plate may be adjusted at any angle desired. At each end of the plate D is formed a hollow sleeve, $h$, through which passes a rod, G. In each sleeve $h$ is a half-box, $m$, adjusted by means of a set-screw, $i$, to form a perfect bearing for the rod G, and allow of its being tightened as it gets worn by the rod sliding back and forth. At the front end of each rod G is attached a clamp, $n$, for holding the file H by means of a set-screw, $p$. To the front end of each rod G, or to the clamp $n$, is attached a finger, I, which runs alongside of the file H, and is curved at its front end. As the rod G, with the file and finger, is moved back, the finger I comes in contact with the side of the saw and raises the file out of the tooth, and lets it into the one below when going forward, assisted by a rolling or revolving motion of the rod, caused by a rod, $s$, attached in an inclined or twisted position to the sleeves $h\ h$, and passing through a groove made in a collar, $t$, or between flanges attached to the same. This collar is placed upon the rod G, between the sleeves $h\ h$, and adjusted upon the same by a set-screw, $x$. From the collar $t$ projects a hook, $v$, upon which a pitman or connecting-rod, J, is attached. The other ends of the two connecting-rods J J are attached to a lever, K, one above and the other below the pivot-point which pivots said lever between the bars C C, so that when working this lever back and forth the files are moved alternately back and forth. L L are two pawls, pivoted in a band, M, which is placed around the lever K, and adjusted on the same by means of a set-screw, $w$. The band M is slotted where the pivot of the lever K passes through it, so as to allow of its being raised and lowered to suit the different kinds of gins.

By working the lever K back and forth, the pawls move the saw tooth by tooth, one bringing it half-way, and then the other moving it on, keeping the saw in regular motion, letting the files cut in another tooth every motion of the lever. By the rolling motion of the files, a somewhat oval tooth is produced, making every tooth the same shape and pitch. Both files work on the same tooth at the same time.

Having thus fully described my invention, what I claim as new, and desire to secure by Letters Patent, is—

1. The combination of the slotted stock A, gage B, frame C, eyebolt $a$, and nuts $b\ b$, all substantially as and for the purposes herein set forth.

2. The arms D D, attached to and made adjustable upon the frame C by means of the eye-bolts d, washers e, and nuts f, and carrying upon their outer ends the adjustable plates E E, substantially as and for the purposes herein set forth.

3. The plates E E, made adjustable upon the adjustable arms D D, and provided with the hollow sleeves h h, half-boxes m m, and set-screws i i, substantially as and for the purposes herein set forth.

4. The combination of the adjustable arms D D, hollow sleeves h h, twisted rod s, and the rod G, with adjustable grooved or flanged collar t, all constructed substantially as and for the purposes herein set forth.

5. The curved finger I, attached to the file-clamp, for the purposes herein set forth.

6. The pawls L L, adjusted upon the lever K by means of the slotted plate M and set-screw w, substantially as and for the purposes herein set forth.

7. The combination of the pivoted lever K, connecting-rods J J, hooks v v, collars t t, and rods G G, substantially as and for the purposes herein set forth.

In testimony that I claim the foregoing I have hereunto set my hand this 27th day of December, 1873.

LAWSON G. PEEL.

Witnesses:
R. W. MILLER,
C. C. MARSHALL.